Jan. 14, 1936.   E. M. D'AUBIGNE   2,028,048
APPARATUS FOR MAKING COMPOSITE GEAR RIMS
Original Filed Nov. 19, 1932   2 Sheets-Sheet 1
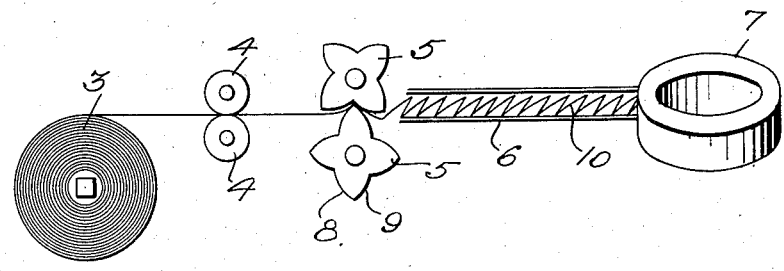
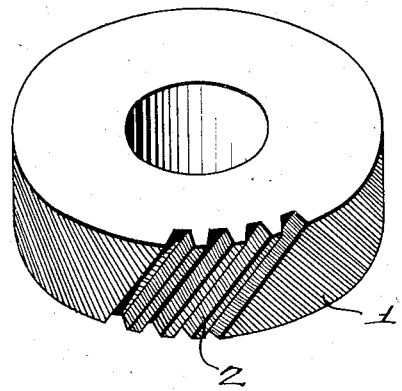
Inventor
Emile Merle d'Aubigne
by his Attorneys
Howson & Howson

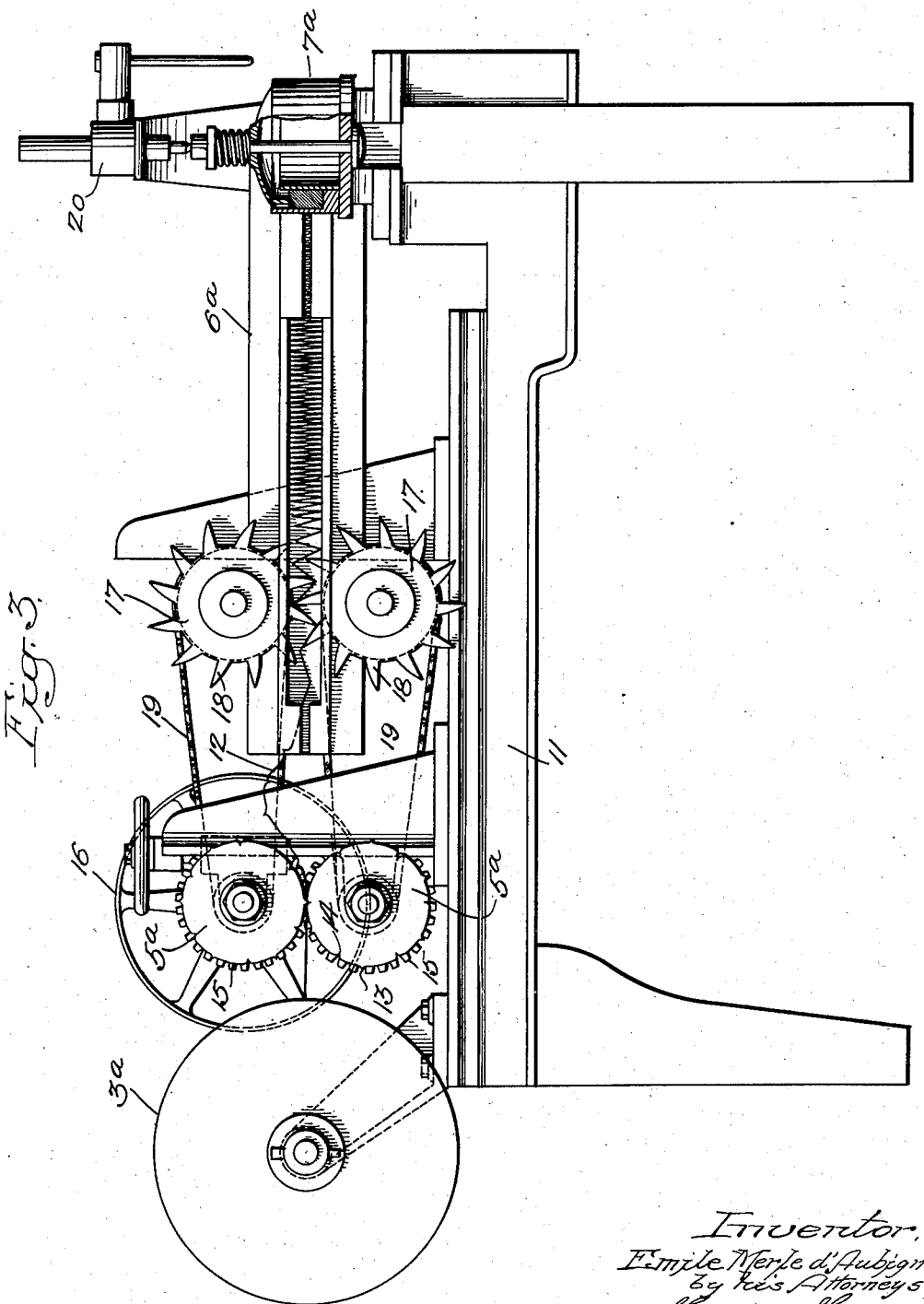

Patented Jan. 14, 1936

2,028,048

UNITED STATES PATENT OFFICE

2,028,048

APPARATUS FOR MAKING COMPOSITE GEAR RIMS

Emile Merle d'Aubigne, Neuilly-sur-Seine, France, assignor to Continental-Diamond Fibre Company, Newark, Del., a corporation of Delaware Original application November 19, 1932, Serial No. 643,519. Divided and this application July 17, 1934, Serial No. 735,656. In France November 24, 1931

11 Claims. (Cl. 154—1)

This invention relates to apparatus for making nonmetallic rims for gears and like articles. The present application is a division of my co-pending application Serial No. 643,519, filed November 19, 1932, which has matured into Patent No. 1,981,782, granted November 20, 1934.

The principal object of this invention is to provide novel apparatus for making an improved non-metallic gear rim having maximum strength and resistance to wear. More specifically, the invention is directed to helical gears, although it is applicable to gears in general and to other devices such as rollers, pulleys, etc.

Another object of the invention is to provide novel apparatus for practicing the improved method and for forming the working body or rim of the improved gear disclosed and claimed in my said co-pending application.

Other objects of the invention will be apparent hereinafter. A full and clear understanding of the invention, as exemplified by diagrammatic and practical forms, may be had from the following detailed description taken together with the accompanying drawings.

In the drawings:

Figure 1 is a perspective view illustrating the improved helical gear construction which may be formed by the apparatus of the present invention;

Figure 2 is a diagrammatic illustration of apparatus for forming the rim of the improved gear or similar objects; and Figure 3 is a side elevational view of a practical machine for forming the working body or rim of the improved gear or like articles.

Although the present invention is not limited to the formation of any particular object nor to any specific material of which the object may be formed, it is particularly adapted to the formation of the working body or rim of an improved helical gear such as described in detail in my said co-pending application and claimed therein. The invention is also particularly directed to the formation of such a gear from fibrous material impregnated or treated with a binder. Preferably, canvas impregnated with synthetic resin of the phenolic type is used, as described in my said co-pending application. It is unnecessary here to describe in detail the structure of the improved article and the method of making the same, since these do not form a part of the present invention and reference may be had to the co-pending application for a full description of the article and method.

For the present purpose, it suffices to state that the helical gear illustrated in Figure 1 is formed of annularly disposed laminations 1 which are recumbent or angularly inclined, as clearly shown, and the gear teeth 2 are cut at substantially right angles or perpendicular to the direction of the laminations. By thus designing the gear, the flanks or working surfaces of the gear teeth are substantially at right angles to the laminations and this construction gives maximum strength and durability.

In Figure 2, there is illustrated diagrammatically apparatus for forming the gear working body or any similar object which may be advantageously constructed of laminated material. A roll of binder-treated fibrous sheet material is shown at 3 and the strip of material passes through feed rolls 4. A pair of forming or bending gears 5 serve to fold the strip material in the desired fashion to form successive laminations and these laminations are passed through a guide 6 which extends tangentially from an annular receptacle 7. The teeth of gears 5 are formed with long and short sides 8 and 9, respectively. Due to this peculiar formation of the folding gears, the successive folds or laminations 10 which pass through guide 6 are alternately long and short. This causes the laminations to assume a recumbent position. As the laminations are forced through the guide and are arranged annularly in receptacle 7, they are compressed and take a desired recumbent position.

After the laminations are thus arranged annularly side by side, they are subjected to a compressing and molding operation which is described in detail in the said co-pending application. The receptacle 7 preferably has associated therewith an arbor press or like device (not shown) which may be used in the subsequent compressing and molding operation as described in the co-pending application. Since the present invention is not concerned with the final step of compressing and molding the laminated body, it is unnecessary to describe further this operation.

In Figure 3, there is illustrated a practical machine for carrying out the desired purpose. This machine comprises a supporting framework 11 and the elements carried thereby, described more particularly hereinafter. In this instance, the annular receptacle is shown at 7a and has tangentially associated therewith the guide 6a through which the folds or laminations move. The roll or wound strip material is shown at 3a. A pair of folding wheels 5a correspond to gears 5 of Figure 2 and are adapted to form successive uneven folds in the strip material 12. The working surfaces of wheels 5a are provided with alternate projections and depressions 13 and 14, respectively, which are unevenly spaced so as to form alternative long and short folds or laminations in the strip material. Wheels 5a are driven at the desired constant speed by means of intermeshed gears 15, which, in turn, are driven from a suitable pulley wheel 16 connected to a driving source (not shown).

A pair of pusher wheels 17 are arranged for cooperation with each other to push the successive folds or laminations of the strip material through guide 6a. These wheels are provided with intermeshing teeth 18, which move in slots provided in guide 6a, as illustrated. The pusher wheels are preferably connected by means of chains 19 to wheels 5a and gears 15 so as to be driven thereby.

In operation, the successive folds or laminations are pushed along guide 6a and assume a slightly recumbent position due to the uneven folding of the strip, as above mentioned. The laminations pass into receptacle 7a and are annularly arranged therein as above described. It will be noted that in this illustration, the uneven folding of the strip and the slightly recumbent positions of the laminations are less pronounced than in the illustration of Figure 2, it being remembered that Figure 2 is a diagrammatic illustration and is somewhat exaggerated to illustrate more clearly the general principles of the apparatus.

After the desired laminated annular body or rim has been formed, it is axially compressed by means of the arbor press 20, as above mentioned. The compressed rim is then assembled with any suitable gear web and subjected to the heating and molding process; after which the gear teeth are cut or machined, as fully described in the co-pending application.

Although the apparatus has been described with particular reference to the formation of helical gears, it will be understood that the invention is not thus limited but is directed to the formation of any body in which laminations are adjacently arranged in an annulus. The laminations may be disposed at an angle, as herein described, or they may be vertically arranged depending upon the particular article being formed. Although a specific practical form of the apparatus has been disclosed and described herein for the purpose of illustration, it is to be understood that various modifications and changes may be made without departing from the invention.

I claim:

1. Apparatus for forming a non-metallic rim portion of a gear, comprising means for forming laminations of fibrous sheet material and an associated binder, and means for arranging said laminations side by side in an annulus with the laminations extending from one face of the annulus to the opposite face thereof.

2. Apparatus for forming a non-metallic rim portion of a gear, comprising means for folding a strip of fibrous sheet material and an associated binder to form laminations, and means for arranging said laminations side by side in an annulus with the laminations extending from one face of the annulus to the opposite face thereof.

3. Apparatus for forming a non-metallic rim portion of a gear, comprising an annular receptacle, a guide extending tangentially from said receptacle, means for forming laminations of fibrous sheet material and an associated binder, and means for positioning and moving said laminations side by side in said guide to arrange said laminations annularly in said receptacle.

4. Apparatus for forming a non-metallic rim portion of a gear, comprising an annular receptacle, a guide extending tangentially from said receptacle, means for folding a strip of fibrous sheet material and an associated binder to form laminations, and means for positioning and moving said laminations side by side in said guide to arrange said laminations annularly in said receptacle.

5. Apparatus for forming a non-metallic rim portion of a gear, comprising an annular receptacle, a guide extending tangentially from said receptacle, means for folding a strip of fibrous sheet material and an associated binder unevenly to form laminations, and means for positioning and moving said laminations side by side in said guide to arrange said laminations annularly in said receptacle, the uneven folds causing the laminations to assume a recumbent position.

6. Apparatus for forming a non-metallic rim portion of a gear, comprising an annular receptacle, a guide extending tangentially from said receptacle, a pair of wheels adapted to fold a strip of fibrous sheet material and an associated binder to form laminations, and a pair of toothed wheels for positioning and moving said laminations side by side in said guide to arrange said laminations annularly in said receptacle.

7. Apparatus for forming a non-metallic rim portion of a gear, comprising an annular receptacle, a guide extending tangentially from said receptacle, a pair of wheels adapted to fold a strip of fibrous sheet material and an associated binder unevenly to form laminations, and a pair of toothed wheels for positioning and moving said laminations side by side in said guide to arrange said laminations annularly in said receptacle, the uneven folds causing the laminations to assume a recumbent position.

8. Apparatus for forming a non-metallic rim portion of a gear, comprising means for forming laminations of fibrous sheet material and an associated binder, and means for arranging said laminations recumbently side by side in an annulus with the laminations extending from one face of the annulus to the opposite face thereof.

9. Apparatus for forming a non-metallic rim portion of a gear, comprising means for forming laminations of fibrous sheet material and an associated binder, and means for arranging said laminations side by side in an annulus with the laminations lying in planes extending transversely between the opposite faces of the annulus.

10. Apparatus for forming a non-metallic rim portion of a gear, comprising means for folding a strip of fibrous sheet material and an associated binder unevenly to form laminations, and means for arranging said laminations side by side in an annulus with the laminations extending from one face of the annulus to the opposite face thereof, the uneven folds causing the laminations to assume a recumbent position.

11. Apparatus for forming a non-metallic rim portion of a gear, comprising means for forming laminations of fibrous sheet material and an associated binder, means for arranging said laminations side by side in an annulus with the laminations extending from one face of the annulus to the opposite face thereof, and means for compressing the annulus axially.

EMILE MERLE D'AUBIGNE.